July 14, 1931.  F. B. CROSBY  1,814,586
APPARATUS FOR CONTROLLING THE SHEARING OF MOVING MATERIAL
Filed Aug. 1, 1929  3 Sheets-Sheet 1
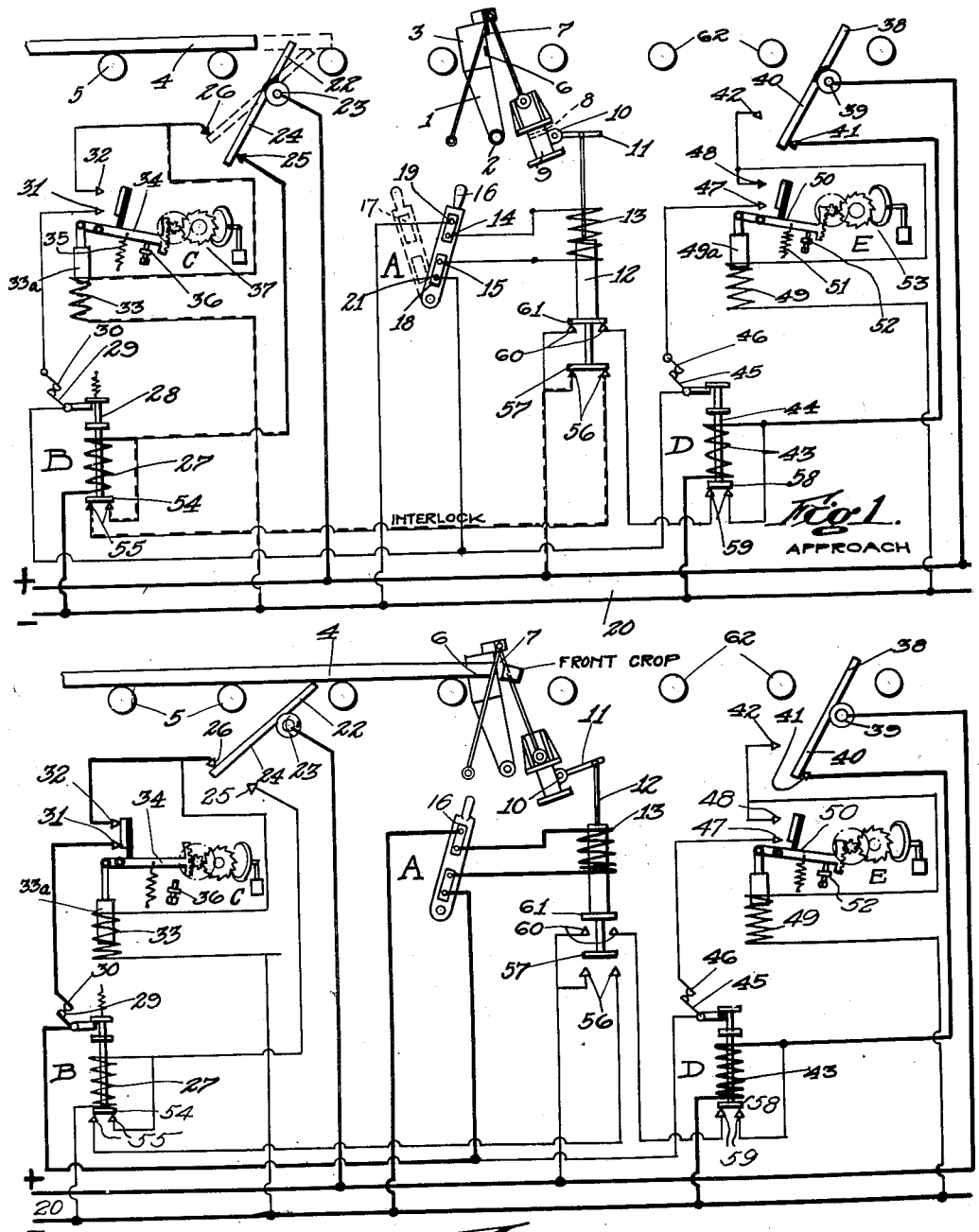
FRONT CROP CUT
Inventor:
Fred B. Crosby
By Geo. H. Kennedy Jr.
Attorney July 14, 1931.  F. B. CROSBY  1,814,586
APPARATUS FOR CONTROLLING THE SHEARING OF MOVING MATERIAL
Filed Aug. 1, 1929  3 Sheets-Sheet 2

RUN OUT

BILLET CUT

Inventor:
Fred B. Crosby

July 14, 1931. F. B. CROSBY 1,814,586
APPARATUS FOR CONTROLLING THE SHEARING OF MOVING MATERIAL
Filed Aug. 1, 1929 3 Sheets-Sheet 3

Inventor:
Fred B. Crosby
By Geo. W. Kennedy Jr.
Attorney

Patented July 14, 1931

1,814,586

UNITED STATES PATENT OFFICE

FRED B. CROSBY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

APPARATUS FOR CONTROLLING THE SHEARING OF MOVING MATERIALS

Application filed August 1, 1929. Serial No. 382,688.

The present invention relates to the shearing or cutting of metal bars, billets, or similar elongated rolled products while the same are in motion which is the practice employed in steel mills where the continuously delivered rapidly moving stock is cut up into commercial lengths as fast as it is delivered from the finishing rolls of the mill.

Devices for thus severing the metal without interrupting or slowing down its continuous high speed delivery from the mill are known in the art as "flying shears." The present invention resides in an improved apparatus for automatically controlling the operations of such a shear, by way of causing each elongated piece of stock as delivered by the mill to be cropped off at its front end and then to be cut into predetermined equal lengths. As will hereinafter appear, the apparatus is entirely automatic in its operation and for any given adjurtment, or setting, will invariably cause the shear to crop the front end of every piece of stock in a uniform manner, and to cut the remainder of each piece into bars or billets of equal length. The above and other advantageous features of the invention will hereinafter more fully appear with reference to the accompanying drawings, in which—

Fig. 1 is a diagrammatic view illustrating the condition of the apparatus as the front end of each piece of rolled stock approaches the shear, and depresses the front crop trigger.

Fig. 2 is a diagrammatic view illustrating the operation of the shear to crop the front end of the stock.

Like reference characters refer to like parts in the different figures.

Figure 3:
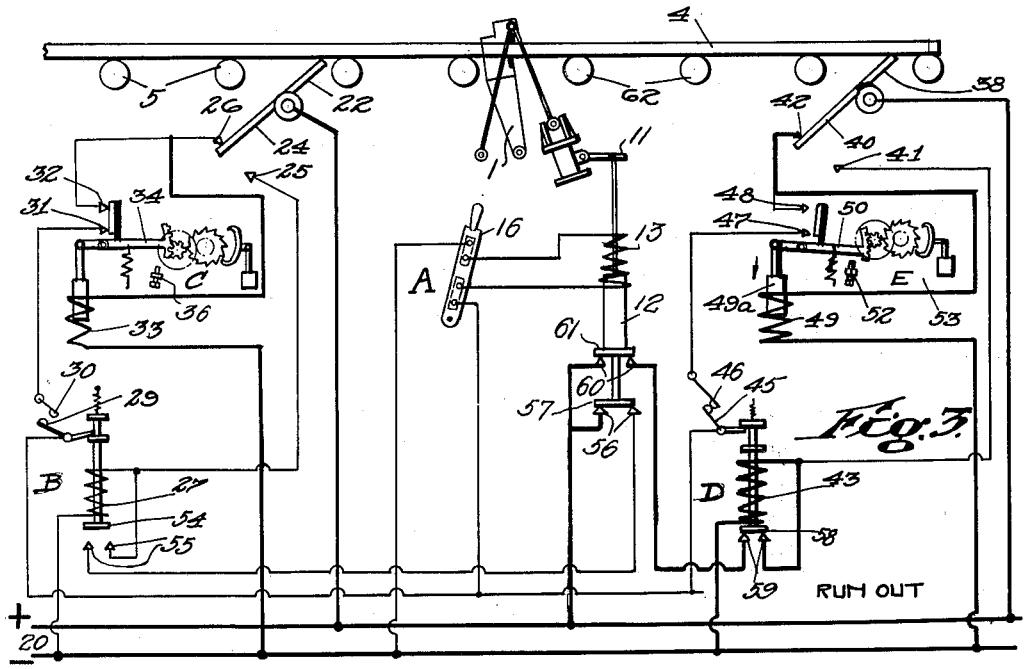
Fig. 3 is a diagrammatic view illustrating the condition of the apparatus as the stock with its front end cropped off runs out beyond the shear and sets in operation the control mechanism for causing the first of the successive shear cuts that produce the predetermined lengths.

Referring first to Fig. 1, the invention is shown by way of example, with the flying shear of the type shown and described in Edwards Patent No. 1,521,514 issued December 30, 1924, although it is to be understood that the invention is equally applicable to other types of shearing devices. The shear, in the form shown, comprises a swinging shear frame 1 pivoted at 2, the frame 1 providing an opening 3 for the passage of stock 4 which as delivered from the mill is moved longitudinally in the direction of the arrow on the conveyor rolls 5, 5. Adjacent the opening 3, the shear provides the usual fixed and movable blades 6 and 7, respectively, which are arranged to perform a cutting operation on each swing of the frame 1 in the direction of travel of the stock 4. Such a swing effected, as here shown, by movement of a piston 8 in a cylinder 9, may be inaugurated by the operation of any suitable valve 10 for the control of the pressure medium used in the cylinder 9.

A lever 11 for operating the valve 10 is connected to the plunger 12 of a solenoid 13 so that each time the solenoid 13 is energized, the plunger 12 will be moved to operate the valve and cause the shear to function. The terminals of the coil of solenoid 13 are connected to spaced stationary contacts 14 and 15, which are operatively related to a control switch A having a pivotally mounted arm 16. The switch arm 16 provides spaced suitably insulated contact plates 17 and 18; movement of the switch arm 16 from its open or inoperative position shown by broken lines in Fig. 1, to the closed full-line position causes the plates 17 and 18, respectively, to engage the stationary contacts 14 and 15 which are connected to the terminals of the shear operating solenoid 13. The plate 17 is also engaged in this position with a stationary contact 19 permanently connected to one side, as here shown the minus side, of a suitable electrical supply indicated at 20, so that with the control switch A in the position shown, one side of the shear solenoid 13 is permanently connected to one side of the supply 20. The other plate 18 in this position of arm 16 is also in engagement with a stationary contact 21, and it is through this bridging of the contacts 15 and 21 that the other terminal of the solenoid 13 is adapted for connection, at suitable intervals, to the other or plus side of the supply 20, as determined by the stock's automatic operation of certain circuit closing devices, as hereinafter described.

For operating the shear to cut the front crop end, the apparatus provides a flag or trigger 22 disposed in the path of the stock 4 as it approaches the shear, the trigger 22 being pivoted at 23 and being held by gravity in the position shown by full lines in Fig. 1 to dispose its upper end in the path of the approaching stock 4. The trigger 22 provides a downwardly extending contact arm 24 insulated from the stock engaging portion thereof and the arm 24 is connected to the plus side of the electrical supply 20 through pivot 23. The free end of arm 24 is adapted to make engagement with one or the other of spaced stationary contacts 25 and 26, depending upon whether or not any stock is in engagement with said trigger 22. The stationary contact 25, engaged by arm 24 when no stock is passing, is connected to one terminal of the operating coil 27 of a contactor B, the other terminal of which is permanently connected to the minus side of the supply 20. Consequently, when the trigger 22 is up, in the absence of engagement by the stock, as shown in full lines in Fig. 1, the coil 27 of contactor B is energized so as to draw the armature or plunger 28 downwardly, thereby to move a pivoted contact 29 into engagement with another contact 30. The contact 29 is connected to the contact 21 of the control switch A in the open side of the shear solenoid 13, while the contact 30 is connected to one contact 31 of a time delay relay C.

This relay C provides a second contact 32, spaced from the contact 31, and in parallel with the trigger contact 26, the two being connected, as shown by heavy dash lines in Fig. 1, with the relay coil 33, which in turn is connected to the minus side of the supply 20. A pivoted arm 34 of the relay C is normally held out of engagement with the spaced contacts 31, 32 by a spring 35, which draws the arm 34 against an adjustable stop 36, whereby the time element of the relay C may be varied, as is usual in time delay relay devices. The relay C may be of any desired construction and for purposes of illustration is shown as being of the type in which the movement of pivoted arm 34 is controlled by an escapement mechanism 37. Therefore, when the coil 33 is energized to attract its armature or plunger 33a, the arm 34 approaches the spaced contacts 31 and 32 with a relatively slow measured movement, the amplitude of which is determined by the setting of the stop 36. Thus, when trigger arm 24 engages contact 26, to cause the energization of the coil 33, an appreciable time will elapse between the energization of the coil 33 and the bridging of the contacts 31 and 32 by the arm 34. As hereinafter described in detail, this bridging of the contacts 31 and 32 completes the circuit through the shear solenoid 13, as shown by the heavy circuit lines in Fig. 2, and causes operation of the shear to cut off the front crop end of the stock.

For operating the shear to cut the stock into predetermined billet lengths after cutting the front crop, the invention provides a second flag or trigger 38 pivoted at 39 at a predetermined point in advance of the shear and held by gravity in the position shown in Fig. 1, to dispose its upper end in the path of the stock. The trigger 38 provides a downwardly extending contact arm 40 connected to the plus side of the supply 20 through pivot 39 and the free end of contact arm 40 is adapted to make engagement with one or the other of the two spaced stationary contacts 41 and 42, depending upon the engagement or non-engagement of the stock with said trigger 38. The stationary contact 41 is connected to one terminal of the energizing coil 43 of a contactor D, the other terminal of which is permanently connected to the minus side of the supply 20. When the trigger 38 is up, in the absence of engagement by the stock, as shown in Figs. 1 and 2, the coil 43 is energized, and the consequent downward movement of its armature or plunger 44 carries a movable contact 45 into engagement with another contact 46. The contact 45 of the contactor D is connected to the open side of the shear solenoid 13, in parallel with the contact 29 of the contactor B, and through the bridged control switch contacts 15 and 21, while the other contact 46 of contactor D is connected to one contact 47 of a second time delay relay device E. Said relay E provides a second stationary contact 48, spaced from its contact 47, and in parallel with trigger contact 42.

The time delay relay E provides an energizing coil 49, one terminal of which is permanently connected to the minus side of the supply 20, while the other terminal thereof is connected to the said contact 42 of the trigger 38 in parallel with the relay contact 48. The spaced contacts 47 and 48 are adapted to be bridged by a pivoted arm 50 which is normally held away from these contacts by a spring 51 that serves to maintain the arm 50 in engagement with an adjustable stop 52. The armature or plunger 49a of the relay E is adapted to turn the movable arm 50 under the control of an escapement mechanism 53 similar to the escapement mechanism 37 of relay C so that energization of the relay coil 49 will cause the arm 50 to slowly approach the spaced contacts 47 and 48. Consequently, an appreciable time will elapse between energization of the relay coil 49 and the bridging of the contacts 47 and 48 by the relay arm 50, the time interval depending upon the initial setting of the arm 50 by the adjustable stop 52, for a purpose which will hereinafter appear.

The plunger 28 of the contactor B carries a bridging member 54 which, when the coil 27 is energized, is held in engagement with a pair of spaced interlock contacts 55, one of which is connected to one terminal of the coil 27, while the other is connected to one of a pair of spaced interlock contacts 56 adapted to be engaged by a bridging member 57 carried by the plunger 12 of the shear solenoid 13. Since the other contact 56 is permanently connected to the plus side of the supply 20, it is evident that with the shear solenoid 13 in a deenergizing condition and with the coil 27 of contactor B energized, as shown in Fig. 1, a holding circuit for the coil 27 will be established through the bridged interlock contacts 55 and 56 in parallel with the circuit established through the trigger operated contacts 24 and 25. The plunger 44 of the contactor D similarly provides a bridging member 58 engaging interlock contacts 59, one of which is connected to the coil 43 while the other is connected to interlock contacts 60 adapted to be engaged by a second bridging member 61 carried by the shear solenoid plunger 12. Therefore, with the shear solenoid 13 deenergized and the coil 43 energized, a holding circuit for the contactor coil 43 is established through the bridged interlock contacts 59 and 60. The purpose of these interlock circuits for the contactor coils 27 and 43 will hereinafter appear in connection with the following description of the complete operating cycle of the apparatus.

Referring to Fig. 1, the apparatus is shown as it appears when the stock 4 is approaching the shear with the triggers 22 and 38 both up and with the operating handle 16 of the control switch A moved into closed position for automatic operation of the shear. With the trigger 22 up, the arm 24 carried thereby is maintained in engagement with the stationary contact 25, so that the coil 27 of the contactor B is energized as indicated by the heavy circuit lines and arrows to maintain the contacts 29 and 30 of the contactor B closed. At the same time, with the trigger 38 up, the arm 40 carried thereby is held in engagement with the stationary contact 41 to energize the coil 43 of the contactor D and hold the contacts 45 and 46 closed. With this condition, it will be noted that the shear solenoid 13 remains deenergized since the open side of the solenoid 13 is connected in parallel to the then-deenergized contacts 31 and 47 of the time delay relays C and E respectively. In other words, the closing of the contactors B and D merely serves to maintain the control circuits in readiness for completing the energizing circuit of the shear solenoid 13 upon operation of either trigger 22 or 38.

Let it now be assumed that stock 4 approaching over the rolls 5 depresses the trigger 22, as shown in dotted lines in Fig. 1, thus moving contact arm 24 into engagement with contact 26 and breaking the circuit between the contacts 24 and 25. When this occurs, two things happen, first the circuit of the coil 27 of the contactor B is maintained through the bridged interlock contacts 55 and 56, in spite of the deenergization of contact 25, and second, the circuit of the coil 33 of the time delay relay C is completed by the engagement of trigger contact 24 with stationary contact 26 as indicated by heavy dotted circuit lines. At the moment of the energization of the time delay relay coil 33, the stock 4 has not yet entered between the blades 6 and 7 of the shear and since, as previously pointed out, the arm 34 is slowly turned about its pivot under the pull of the plunger 33a, an appreciable interval occurs between depression of the trigger 22 and bridging of the contacts 31 and 32 by the arm 34. During this interval the stock enters the shear and passes between the blades 6 and 7 and the relay C is so set that the shear is operated by bridging of the contacts 31 and 32 only after enough stock has passed beyond the open shear blades to provide a front crop of the desired length. Obviously, the length of the front crop can be varied by means of the adjustable stop 36 of relay C.

Referring now to Fig. 2, the time delay relay arm 34 is shown as having finally bridged the gap between contacts 31 and 32, thereby immediately completing the circuit of the shear solenoid 13, as indicated by the heavy circuit lines and arrows, through the then-closed contacts 29 and 30 of the contactor B and the contacts 15 and 21 of the control switch A. Upon energization of the solenoid 13, the plunger 12 is drawn upwardly to operate the valve 10 and cause the shear frame 1 to swing forward and sever the front crop, as indicated. When the plunger 12 of the shear solenoid 13 is drawn upwardly, it disengages the bridging member 57 from the interlock contacts 56, thereby breaking the holding circuit of the coil 27 of the contactor B and causing the contacts 29 and 30 of contactor B to be opened, as shown in Fig. 3, and deenergizing the shear solenoid 13. This automatic deenergization of the contactor B upon operation of the shear to cut the front crop renders the trigger 22 ineffective to cause further operation of the shear while the piece of stock which has just been cropped is passing over the rolls 5, for it is evident that the circuit from the bridged contacts 31 and 32 of the time delay relay C to the solenoid 13 can not be completed while the contacts 29 and 30 of the deenergized contactor B remain open. Thus the breaking of the holding circuit for coil 27 of the contactor B upon upward movement of the shear solenoid plunger 12 prevents any repeating of the shear due to the continued depression of the front crop trigger 22, while the piece of stock from which the front crop has been severed is being cut into equal lengths under the control of the trigger 38, as will now be described.

Referring now to Fig. 3, the advancing cropped end of the stock 4 is shown as having depressed the trigger 38 to move its contact arm 40 into engagement with the stationary contact 42 and to break the circuit of the contactor coil 43 at the contact 41. However, this does not have the effect of deenergizing the coil 43, since the circuit through the coil 43 is then maintained through the bridged interlock contacts 59 and 60, as indicated by the heavy circuit lines, the plunger 12 of the shear solenoid 13 having already returned to its lower position upon opening of the contractor B, as just described. Upon the trigger contact 40 engaging the stationary contact 42, the circuit of the coil 49 of the time delay relay E is completed, thereby drawing the plunger 49a within the coil 49 to cause the pivoted relay arm 50 to slowly approach the open contacts 47 and 48. As the arm 50 approaches the contacts 47 and 48, the stock continues on beyond the depressed trigger 38 and the shear is not operated to cut the first billet length until the circuit of the solenoid 13 is finally completed by bridging of the time delay relay contacts 47 and 48. Therefore, the length of the first billet depends upon the distance at which the trigger 38 is mounted in advance of the shear and upon the interval which occurs between energization of the relay coil 49 and the closing of the contacts 47 and 48 by the relay arm 50. As previously pointed out, this interval can be varied by means of the stop 52 which determines the position of the arm 50 when the relay coil 49 is deenergized and consequently the angle through which the arm 50 has to turn in order to engage contacts 47 and 48. The relay E therefore provides means for readily varying the length of the billets that are cut by the shear, since with the trigger 38 mounted at a given distance from the shear, say twenty-five feet, billets ranging for example from twenty-five to thirty feet in length can be cut by adjusting the time element of relay E, and without changing the position of the trigger 38.

Figure 5:
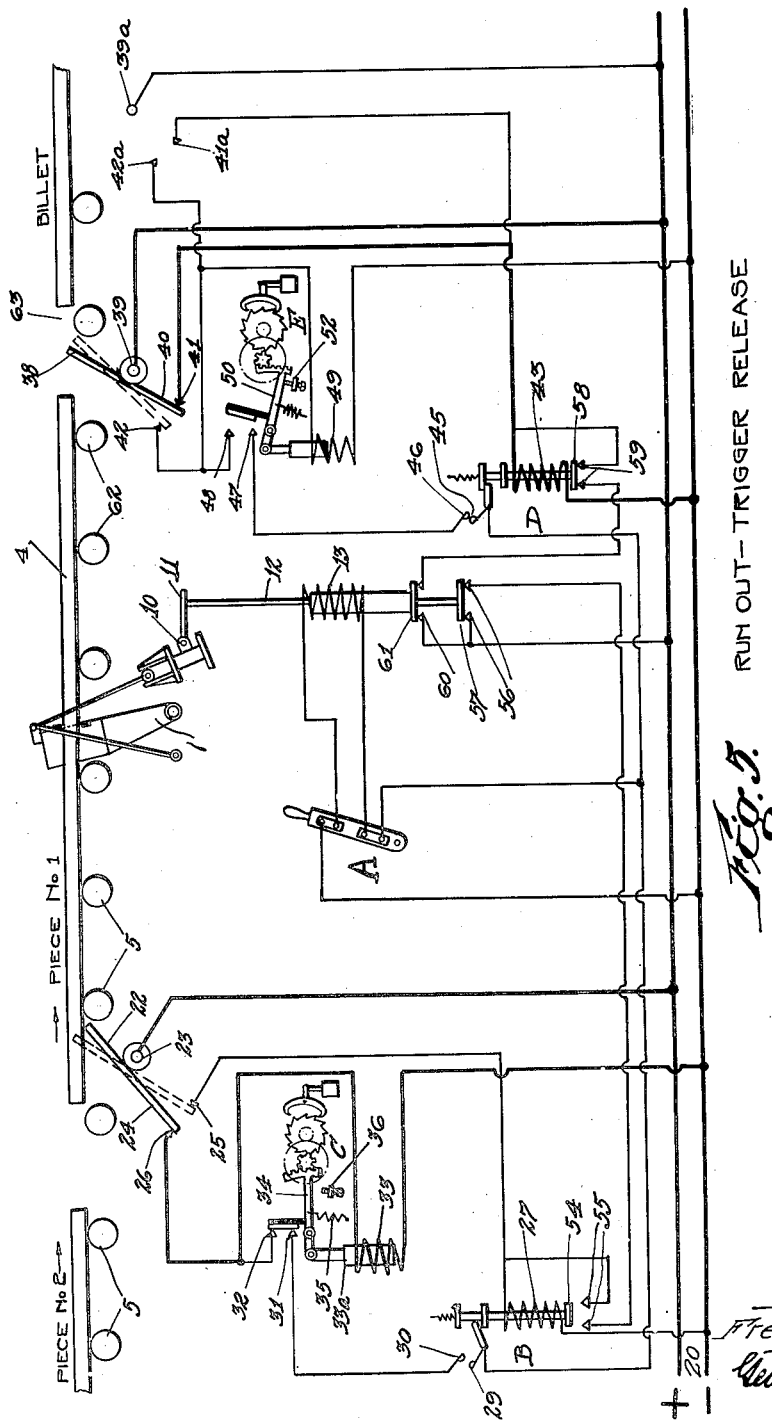
Fig. 5 is a diagrammatic view illustrating the condition of the apparatus between the successive cuts of the stock into predetermined lengths.

Further variation in the lengths of the billets cut by the shear can be obtained by moving the trigger 38 with respect to the shear and a convenient manner of taking care of the circuits controlled by the trigger 38 for different positions thereof is indicated in Fig. 5. For this purpose, one or more additional pairs of spaced contacts 41a and 42a are provided connected in parallel with contacts 41 and 42. There is also provided one or more additional contacts 39a adapted to energize the trigger contact arm 40 when the trigger 38 is mounted in a new position nearer to or farther removed from the shear in order to decrease or increase the length of the billets being cut, as desired. Obviously the trigger 38 will function in exactly the same manner when cooperating with any of the contacts 41 and 42 or 41a and 42a respectively.

Figure 4:
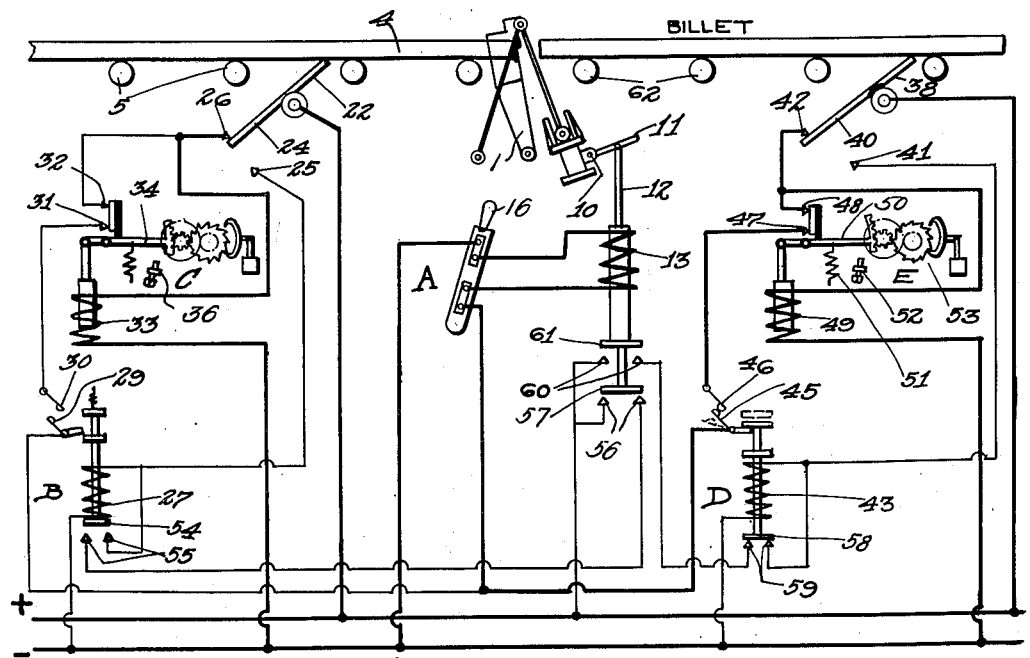
Fig. 4 is a diagrammatic view illustrating the operation of the shear for the first and subsequent cuts of stock into predetermined lengths.

When the shear solenoid 13 is energized upon closure of contacts 47 and 48 of the time delay relay E, the shear is operated as shown in Fig. 4 to sever a billet of predetermined length from the moving stock. As this occurs, upward movement of the plunger 12 breaks the holding circuit of the contactor coil 43 at the interlock contacts 60 thereby deenergizing the coil 43 of contactor D and causing its contacts 45 and 46 to open as indicated in dotted lines in Fig. 4. This has the effect of breaking the circuit of the shear solenoid 13 even though the circuit of coil 49 of the time delay relay E is still held closed by passage of the billet length just cut over the depressed trigger 38. Upon opening of the contactor D, the interlock contacts 59 are also opened, so that when the plunger 12 of the deenergized shear solenoid 13 drops back to again bridge the interlock contacts 60, the contactor coil 43 is not energized and contactor D remains open while the billet just cut is passing over the trigger 38. In other words, the automatic opening of the contactor D following a billet cut, serves not only to reset the shear, but also prevents the shear from repeating as long as the trigger 38 is held down by passage of the billet just cut.

Referring now to Fig. 5, the rear end of a billet is shown as having released the trigger 38, thereby permitting the trigger 38 to swing up and disengage its contact 40 from the stationary contact 42 and to reengage the contact 41. In order to insure the free upward movement of the trigger 38 between its release by the rear end of one billet and its engagement by the advancing end of the piece of stock being cut, the conveyor rolls 62 beyond the shear are driven at a somewhat higher speed than the rolls 5 so that as soon as a billet is cut by the shear it separates itself from the stock still on the rolls 5 to provide an appreciable gap at 63. When the trigger 38 swings upwardly upon release by the rear end of a billet as shown in Fig. 5, the circuit of the coil 43 of the contactor D is reestablished by engagement of the contacts 40 and 41, as indicated by heavy circuit lines. Therefore, when the advancing end of the piece depresses the trigger 38 a second time to energize the relay E and complete the circuit of shear solenoid 13, a second billet will be cut by the shear which will be of exactly the same length as the first billet, and this automatic functioning of the shear will continue until the piece of stock is completely cut up.

During all the time that the piece of stock being cut up is passing into the shear, the crop trigger 22 remains depressed so that the contactor B remains open as shown in Figs. 3, 4 and 5. However, upon release of the trigger 22 by the rear end of a piece of stock, as indicated in dotted lines in Fig. 5, the trigger 22 moves up to the position shown in Fig. 1, thereby again energizing the coil 27 to close contactor B and placing the circuit of the shear solenoid 13 in readiness for operating the shear to crop the advancing end of the next piece of stock a predetermined interval after it depresses the trigger 22. Obviously when the trigger 22 is released by the rear end of a piece of stock that has just been cut up, the spring 35 acting on the arm 34 of the time delay relay C immediately opens the circuit between the contacts 31 and 32 and the arm 34 is again moved into engagement with its stop 36, thereby insuring the proper functioning of the time delay relay C when the trigger 22 is again depressed to cause the cutting of a front crop of predetermined length.

I claim:

1. Apparatus for shearing moving material comprising a flying shear, a flag in the approach to said shear for operation by the advancing end of said material, a second flag beyond said shear for operation by the advancing end of material passing through the shear, and time delay relays cooperating with both of said flags and with said shear to control both the length of the front crop cut by said shear and the lengths of the billets cut by said shear.

2. Apparatus for shearing moving material comprising a flying shear, a flag in the approach to said shear for operation by the advancing end of said material, a second flag beyond said shear for operation by the advancing end of material passing through the shear, time delay relays cooperating with both of said flags and with said shear to control both the length of the front crop cut by said shear and the lengths of the billets cut by said shear, and means provided by the operation of said shear for the front crop to render the front crop relay inoperative.

3. Apparatus for shearing moving material comprising a flying shear, a solenoid for procuring operation of said shear and electrical circuit controlling devices separately actuated by movement of the material for automatically energizing said shear solenoid to operate said shear, first for the removal of a front crop and then to divide the material into predetermined lengths, and means responsive to the crop-removing operation of said shear for rendering inoperative the first-operated circuit controlling device.

4. Apparatus for shearing moving material comprising a flying shear, a solenoid for procuring the operation of said shear, a trigger in the approach to said shear and operated by movement of the material to energize said solenoid and actuate said shear for the cropping of the front end of said material and a second trigger beyond said shear and operated by movement of the material to energize said solenoid to actuate said shear for the division of said material into predetermined lengths, and means responsive to the cropping operation of said shear for rendering the first-mentioned trigger inoperative for the energization of said solenoid until the material has moved beyond said trigger.

5. Apparatus for shearing moving material comprising a flying shear, a solenoid for procuring the operation of said shear, a time delay relay, a trigger in the approach to said shear and operated by movement of the material to operate said time delay relay and energize said shear solenoid after a predetermined length of material has passed through the shear for the front crop, a second time delay relay, a second trigger beyond said shear and operated by movement of the material to operate said second time delay relay and energize said shear solenoid after a predetermined length of material has passed through the shear following the cutting of the front crop.

6. Apparatus for shearing moving material comprising a flying shear, a solenoid for procuring the operation of said shear, a time delay relay, a trigger in the approach to said shear and operated by movement of the material to operate said time delay relay and energize said shear solenoid after a predetermined length of material has passed through the shear for the front crop, a second time delay relay, a second trigger beyond said shear and operated by movement of the material to operate a said second time delay relay and energize said shear solenoid after a predetermined length of material has passed through the shear following the cutting of the front crop, and means responsive to the initial cropping operation of said shear for preventing energization of the first-mentioned time delay relay until the full length of the material has moved beyond the first-mentioned trigger.

FRED B. CROSBY.